United States Patent [19]
Matsuki

[11] Patent Number: 5,816,353
[45] Date of Patent: Oct. 6, 1998

[54] ENGINE FUEL CUT CONTROLLER

[75] Inventor: Yoshitaka Matsuki, Yokohama, Japan

[73] Assignee: Nissan Motor Co., Ltd., Kanagawa, Japan

[21] Appl. No.: 661,202

[22] Filed: Jun. 10, 1996

[30] Foreign Application Priority Data

Jun. 21, 1995 [JP] Japan ................................ 7-154755

[51] Int. Cl.⁶ .................................................. B60K 28/16
[52] U.S. Cl. ............................................ 180/197; 701/86
[58] Field of Search ..................... 180/197; 364/426.01, 364/426.03; 701/86

[56] References Cited

U.S. PATENT DOCUMENTS

| | | | |
|---|---|---|---|
| 5,473,544 | 12/1995 | Yamashita | 180/197 |
| 5,559,703 | 9/1996 | Iwata et al. | 180/197 |
| 5,609,218 | 3/1997 | Yamashita et al. | 180/197 |

FOREIGN PATENT DOCUMENTS 1-227830  9/1989  Japan .
4-295146  10/1992  Japan .

*Primary Examiner*—David M. Mitchell
*Attorney, Agent, or Firm*—McDermott, Will & Emery

[57] ABSTRACT

In a fuel cut controller wherein fuel supply is stopped to some cylinders when there is a fuel cut request, an ordinary fuel cut mode and a multi-cylinder fuel cut mode are set. When the ordinary fuel cut mode has continued for a predetermined time, fuel cut is performed in an equal or larger number of cylinders in the multi-cylinder fuel cut mode, and the engine output torque therefore decreases further. At the same time, due to the increase in cylinders where fuel supply is stopped, the amount of fresh air flowing from these cylinders to a catalytic converter increases, and the amount of unburned fuel flowing into the converter from the cylinders where fuel supply is performed decreases. As a result, heat due to reaction of unburned fuel in the converter decreases, and the increasing amount of fresh air cools the converter, so temperature rise of the converter is suppressed.

7 Claims, 7 Drawing Sheets

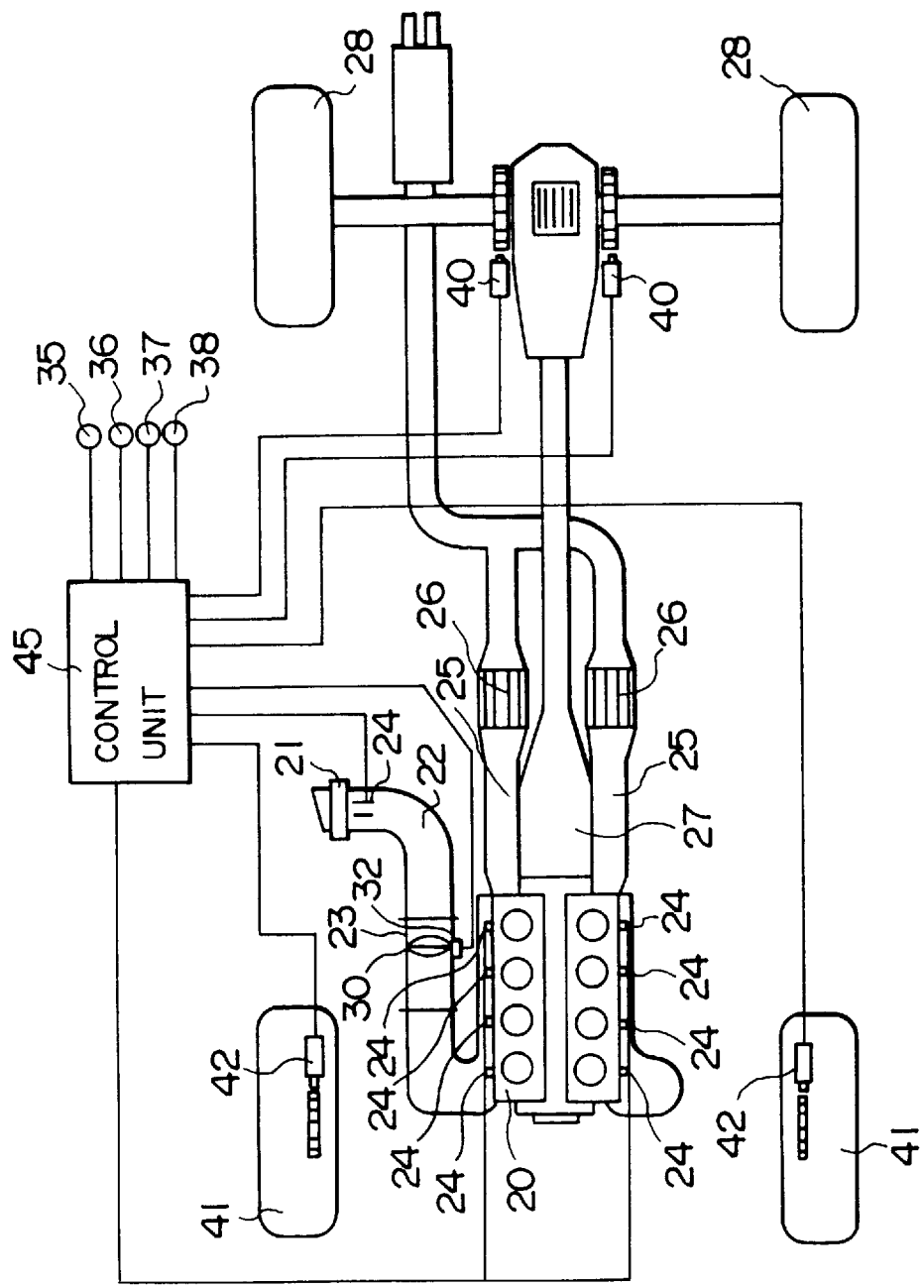
F I G . 1

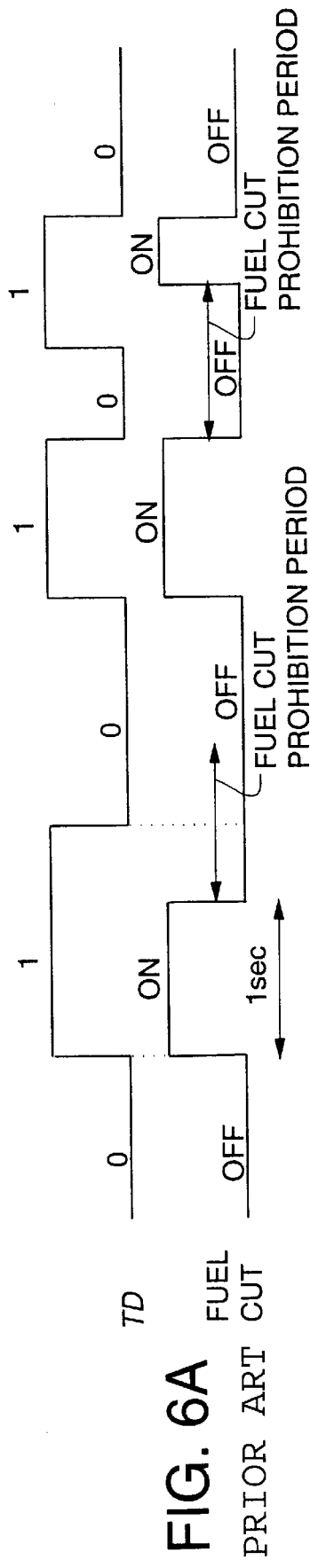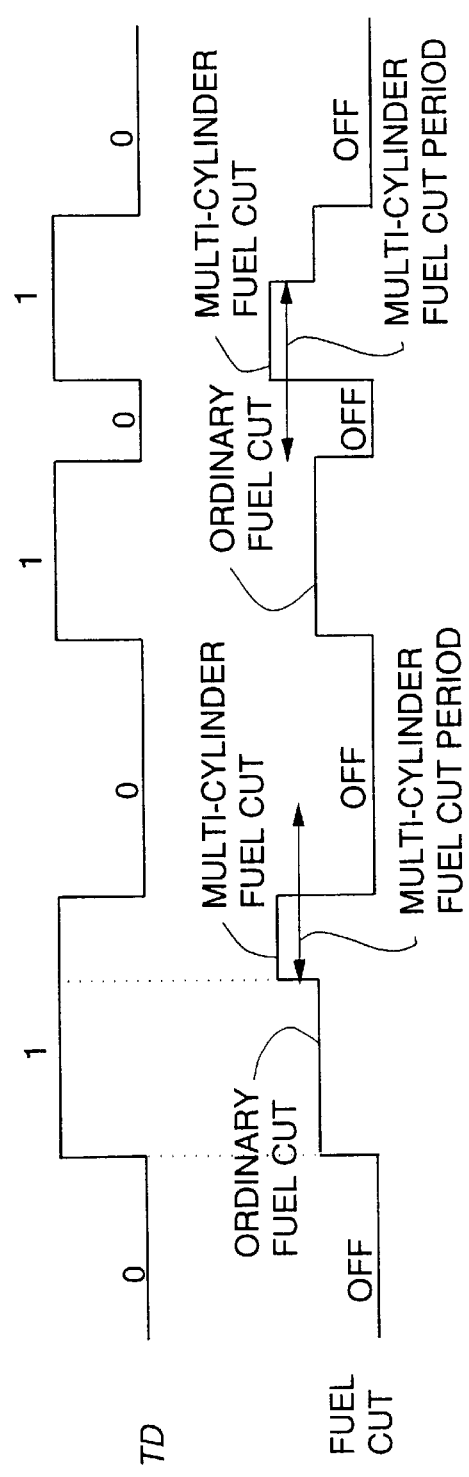
FIG. 6A PRIOR ART
FIG. 6B

ENGINE FUEL CUT CONTROLLER

FIELD OF THE INVENTION

This invention relates to an engine fuel cut controller used for example in traction control of an automobile.

BACKGROUND OF THE INVENTION

Automobile traction control systems function to prevent the vehicle tires from rotating without gripping the road due to excessive drive force when the vehicle is traveling or accelerating on a slippery road surface, such as a road covered with ice, snow or gravel. This may be achieved by cutting fuel supply to the engine so as to decrease the drive force.

A fuel cut controller for this purpose is described for example in Tokkai Hei 4-295146 published in 1992 and 1-227830 published in 1991 by the Japanese Patent Office.

In this controller, the rotation speeds of the drive wheels and driven wheels are detected, and a slip factor between the drive wheels and road surface is computed from the difference between the two speeds. When the slip factor is greater than a set value, fuel supply to a predetermined cylinder of the engine is cut based on the slip factor. As a result, when the vehicle starts to slip due to excessive drive force, the drive force of the drive wheels is rapidly decreased so as to suppress the slip.

However, when the fuel supply to some of the engine cylinders is cut, the air supplied to cylinders to which fuel supply has stopped, and exhaust including unburned fuel from cylinders to which fuel supply has not stopped, flow into the catalytic converter in the exhaust system. Depending on the engine running conditions, unburned fuel in the converter may react with the air, thereby causing the catalyst temperature to rise above the tolerance level and leading to catalyst deterioration.

In the aforesaid controller, the period during which fuel cut is performed is limited, and fuel cut is prohibited for a certain period after a preceding fuel cut has been made, so that the catalyst temperature does not rise above a certain level.

According to this controller, however, fuel cut is subsequently prohibited for a predetermined period when fuel cut has continued for a prescribed time, and fuel supply is then restarted to all cylinders even when the slip factor of the drive wheels is large. Hence, although temperature rise of the catalytic converter is prevented, the engine drive force cannot be adequately suppressed, and the effect of preventing the drive wheels from slipping remains limited.

SUMMARY OF THE INVENTION

It is therefore an object of this invention to enhance the effect of preventing drive wheels from slipping by fuel cut while controlling a temperature rise of a catalytic converter.

It is a further object of this invention to perform a fuel cut in accordance with a slip factor of the drive wheels.

In order to achieve the above objects, this invention provides a fuel cut controller for cutting fuel supply to cylinders of a multi-cylinder engine of a vehicle according to a fuel cut request for the purpose of reducing a slip of a drive wheel of the vehicle. The controller comprises a mechanism for determining whether or not there is the fuel cut request, a mechanism for performing an ordinary fuel cut wherein fuel supply is stopped to at least one cylinder when there is the fuel cut request and wherein the number of cylinders to which fuel supply is stopped is limited by a predetermined upper limit, a mechanism for measuring a continuation time JFCON of the ordinary fuel cut, a mechanism for determining whether or not the continuation time JFCON has reached a set value FCMAX, and a mechanism for performing a multi-cylinder fuel cut wherein fuel supply is stopped to a number of cylinders no less than the upper limit when the continuation time JFCON reaches the set value FCMAX and the fuel cut request is continued.

It is preferable that the controller further comprises a mechanism for detecting a rotation state of the drive wheel, a mechanism for computing a slip factor of the drive wheel based on the rotation state, and a mechanism for outputting the fuel cut request based on this slip factor.

It is also preferable that the controller further comprises a mechanism for measuring an elapsed time JTFCTI after the continuation time JFCON reaches the set value FCMAX, a mechanism for determining whether or not the time JTFCTI has reached a set value TFCTIM, and a mechanism for terminating the multi-cylinder fuel cut when the time JTFCTI has reached the set value TFCTIM.

In this case, the multi-cylinder fuel cut performing mechanism preferably comprises a mechanism for terminating multi-cylinder fuel cut when there is no fuel cut request before the time JTFCTI reaches the set value TFCTIM, and a mechanism for restarting the multi-cylinder fuel cut when there is a fuel cut request before the time JTFCTI reaches the set value TFCTIM.

It is preferable that the set value TFCTIM is set to be larger the larger a load on the engine.

It is also preferable that the set value TFCTIM is set to be larger the higher a rotation speed of the engine.

The details as well as other features and advantages of this invention are set forth in the remainder of the specification and are shown in the accompanying drawings.

BRIEF DESCRIPTION OF THE DRAWINGS

FIG. 1 is a schematic diagram of the construction of a fuel cut controller according to this invention.

FIGS. 6A and 6B. are timing charts comparing a fuel cut according to this invention with that of the prior art controller.

DESCRIPTION OF THE PREFERRED EMBODIMENTS

Figure 2:
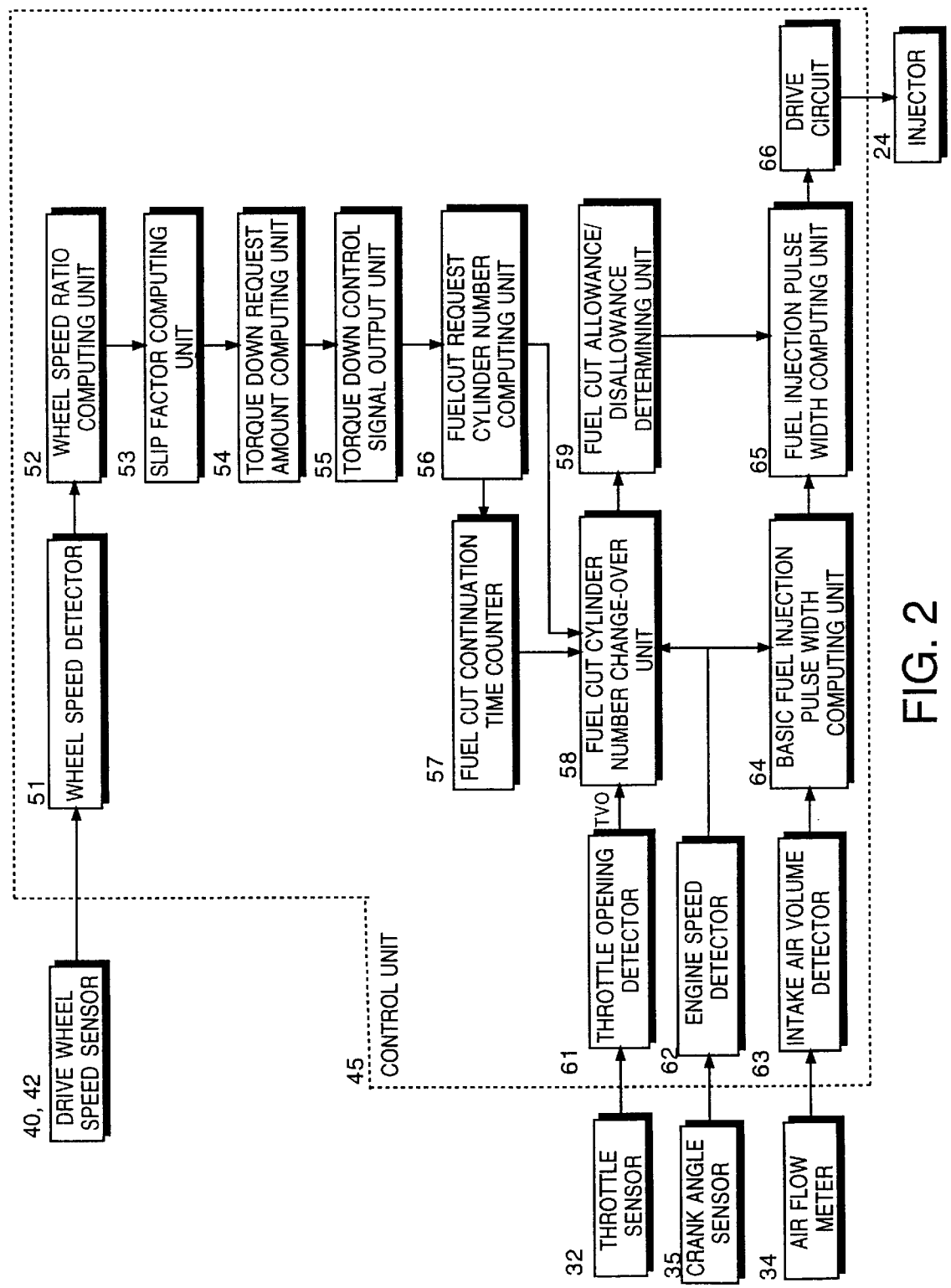
FIG. 2 is a block diagram describing the function of a control unit according to this invention.

Referring to FIG. 1 of the drawings, intake air of an automobile engine 20 is supplied to the engine cylinders via an air cleaner 21, an intake pipe 22, a throttle chamber 23, branches of an intake manifold and intake ports opening to the cylinders. Fuel is injected to each intake port from a fuel injector 24 provided in each cylinder, and is supplied to a combustion chamber in the cylinder as it is mixed with intake air.

The fuel mixture in the combustion chamber is ignited by the electric discharge of a spark plug, and explodes. Exhaust gas is expelled to the outside via an exhaust pipe 25. A catalytic converter 26 is installed midway along the pipe 25. The action of this three-way catalytic converter oxidizes HC and CO, and reduces NOx, in the exhaust.

A throttle valve 30 which opens and closes in response to the operation of an accelerator pedal is provided in the throttle chamber 23. The opening of the throttle valve 30 is detected by a throttle sensor 32, the intake air flowrate is detected by an air flow meter 34, and the rotation speed of the engine 20 is detected by a crank angle sensor 35. The temperature of the cooling water of the engine 20 is detected by a water temperature sensor 36, and the oxygen concentration of the exhaust is detected by an oxygen sensor 37. The catalyst bed temperature of the catalytic converter 26 is detected by a catalyst bed temperature sensor 38.

The output torque of the engine 20 is transmitted to drive wheels 28 via a transmission 27. The rotation speed of the drive wheels 28 of the vehicle is detected by a drive wheel speed sensor 40, and the rotation speed of driven wheels 41 is detected by a driven wheel speed sensor 42. These detected rotation speeds are both averages for the left and right wheels.

Signals from the sensors 32, 34–38, 40 and 42 are input to a control unit 45 comprising a microcomputer.

Based on the input signals, the control unit 45 performs fuel injection control of the fuel injectors 24, and performs traction control of the vehicle.

The control unit 45 comprises a throttle opening detector 61 to which a detection signal is input from the throttle sensor 32, an engine speed detector 62 to which a detection signal is input from the crank angle sensor 35, an intake air volume detector 63 to which a detection signal is input from the air flow meter 34, a basic fuel injection pulse width computing unit 64 which computes a basic fuel injection pulse Tp based on a detected engine speed N and intake air volume Qa, a fuel injection pulse width computing unit 65, and a drive circuit 66 which outputs a fuel injection pulse signal to the injectors 24, as shown in FIG. 2.

Fuel injection control is performed as follows. First, a basic injection amount Tp is computed based on the detected intake air volume Qa and engine speed N by the following relation.

$$Tp = \frac{K \cdot Qa}{N} \quad (1)$$

where K is a constant.

This basic injection amount Tp is corrected by the following equation based on the cooling water temperature Tw, throttle opening TVO and oxygen concentration, and a fuel injection amount Ti is computed.
Ti=Tp·(1+$K_{TW}$+$K_{AS}$+$K_{AI}$+$K_{ACC}$+$K_{DEC}$) $K_{FC}$+Ts (2)
where: $K_{TW}$=water temperature increase correction coefficient $K_{AS}$=increase correction coefficient during and after start-up $K_{AI}$=increase correction coefficient after idle period $K_{ACC}$=acceleration correction coefficient $K_{DEC}$=deceleration correction coefficient $K_{FC}$=fuel cut correction coefficient Ts=battery voltage correction The control unit 45 performs fuel injection control by outputting a pulse signal corresponding to the computed fuel injection amount Ti to the fuel injectors 24.

The control unit 45 further comprises a wheel speed detector 51 to which the detection signals from the wheel speed sensors 40, 42 are input, wheel speed ratio computing unit 52 which computes a rotation speed ratio of the driven wheels 41 and drive wheels 28, slip factor computing unit 53 which computes a slip factor of the drive wheels from the rotation speed ratio of the driven wheels 41 and drive wheels 28, torque down request amount computing unit 54 which computes a torque down request amount of the engine 20 according to the slip factor and a torque down control signal output unit 55 which outputs a torque down control signal according to a torque down request amount, as shown in. FIG. 2.

Figure 3:
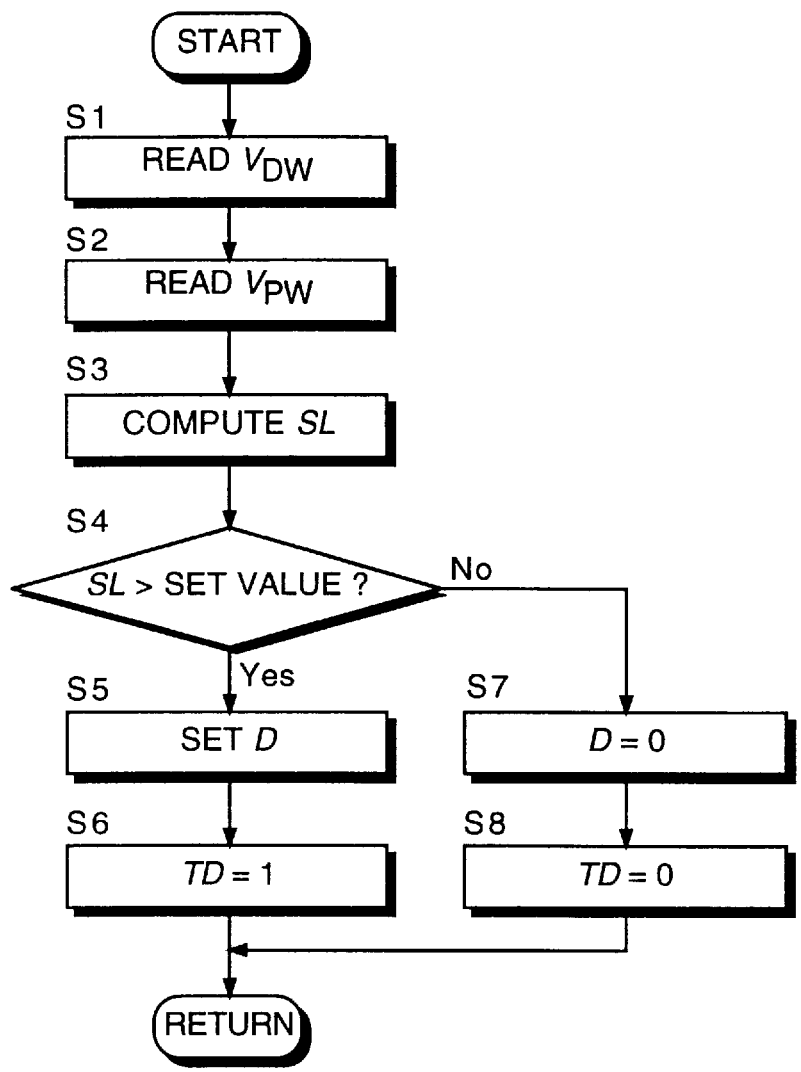
FIG. 3 is a flowchart describing a torque down determining process according to this invention.

Due to the aforesaid construction, the control unit 45 performs a torque down determination of the vehicle according to the flowchart of FIG. 3.

First, as shown in the flowchart of FIG. 3, a torque down request amount when the drive wheels 28 slip, is computed. The routine shown in FIG. 3 is executed at fixed intervals.

A drive wheel speed $V_{DW}$ is read in a step S1, a driven wheel speed $V_{PW}$ is read in a step S2, and a slip factor SL is computed in a step S3.

$$SL = \frac{V_{DW} - V_{PW}}{V_{PW}} \quad (3)$$

When this slip factor SL is larger than a set value, it is determined that the drive wheels 28 are slipping. In this case, a torque down request amount D is set according to the slip factor in a step S5, and a torque down request flag TD is set to 1 in a step S6.

When the slip factor SL is smaller than the set value, it is determined that the drive wheels 28 are not slipping. In this case, the routine proceeds to a step S7, the torque down request amount D is set to 0, and the torque down request flag TD is reset to 0 in a step S8.

The control unit 45 is further provided with a cut request cylinder number computing unit 56 as shown in FIG. 2. An ordinary fuel cut mode and a multi-cylinder fuel cut mode are set in the cut request cylinder number computing unit 56. In the ordinary fuel cut mode, fuel supply is cut to some cylinders for a torque down request time, and the number of cylinders to which fuel supply is stopped, is determined according to the torque down request amount D up to a predetermined upper limit of cylinder number. In the multi-cylinder fuel cut mode, fuel supply is cut to a number of cylinders equal to or larger than this limiting number. The control unit 45 computes the number of cylinders to which fuel supply is cut according to either one of these modes.

The control unit 45 further comprises a fuel cut continuation time counter 57 unit which computes a time for which fuel cut continues in each mode, a fuel cut cylinder number change-over unit 58 which changes over between the ordinary fuel cut mode and multi-cylinder fuel cut mode according to the time for which fuel cut continues in each mode, and a fuel cut allowance/disallowance determining unit 59 which commands fuel cut, but to the extent that the engine 20 would not stop running.

Figure 4A:
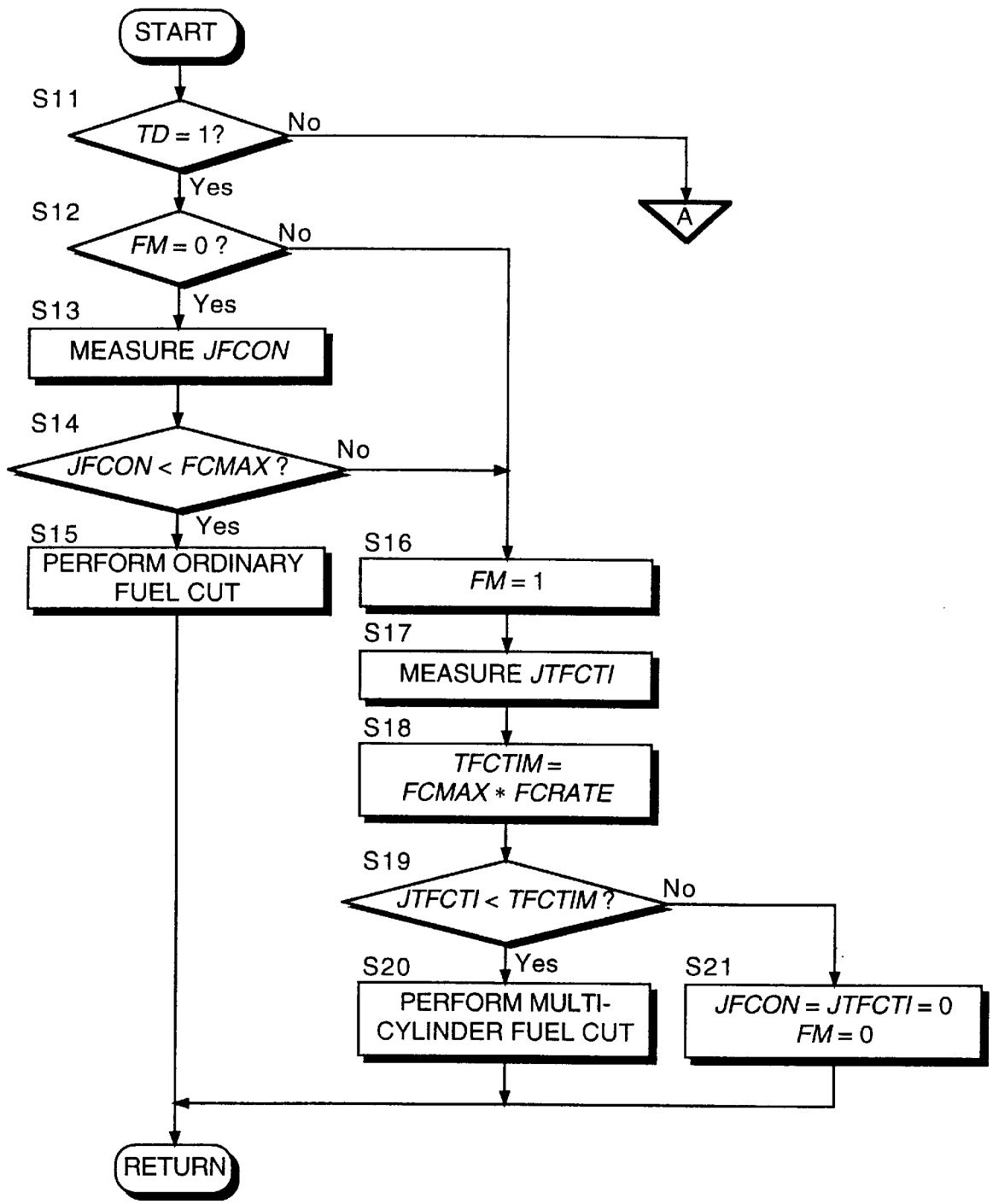
FIGS. 4A and 4B are flowcharts describing a fuel cut control process according to this invention.
Figure 4B:
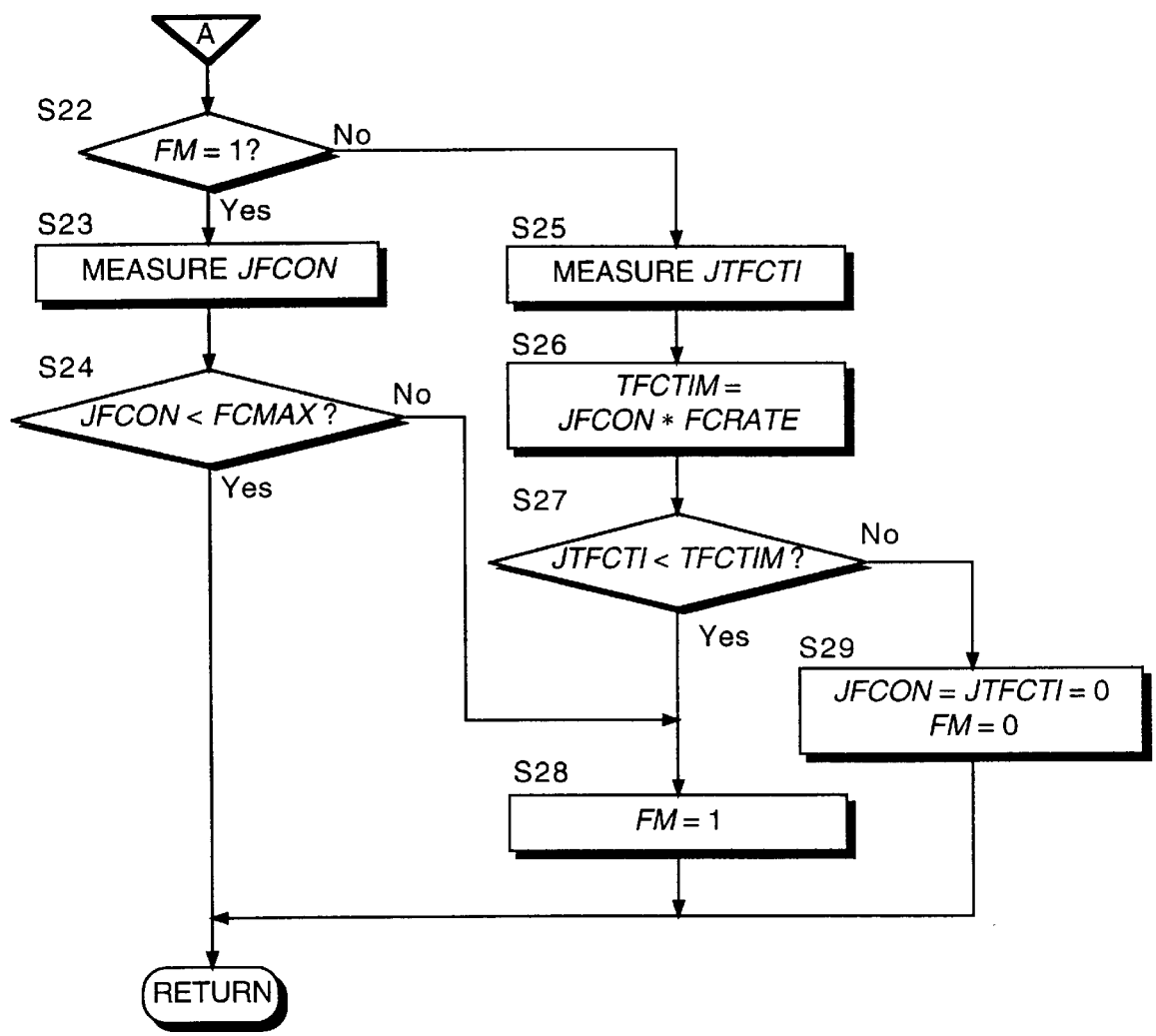

Due to the aforesaid construction, the control unit 45 performs torque down control at fixed intervals according to the flowcharts of FIGS. 4A and 4B based on the result of the torque down determining process of FIG. 3.

In this process, it is first determined in a step S11 whether or not the torque down request flag TD=1, i.e. whether or not fuel cut has been requested.

When TD=1, the routine proceeds to a step S12, and it is determined by a mode determining flag FM whether the present control is the ordinary fuel cut mode or the multi-cylinder fuel cut mode. FM=0 denotes the ordinary fuel cut mode, and FM=1 denotes the multi-cylinder fuel cut mode.

When FM=0, the routine proceeds to a step S13, a continuation time JFCON of the ordinary fuel cut mode is measured, and it is determined in a step S14 whether or not the continuation time JFCON is less than a maximum continuation time set value FCMAX. FCMAX may be set to for example 1 second.

When JFCON is less than FCMAX the routine proceeds to a step S15, and fuel cut is performed in the ordinary fuel cut mode. This fuel injection cut stops fuel injection from the fuel injectors 24 corresponding to a number of cylinders determined according to the torque down request amount D up to a predetermined limit as described hereinabove. The control process is disclosed in the aforesaid examples of the prior art.

On the other hand when JFCON is equal to or greater than FCMAX, the mode determining flag FM is set to 1 in a step S16, and control shifts to the multi-cylinder fuel cut mode in a step S17 and subsequent steps.

In the step S17, a multi-cylinder fuel cut mode continuation time JTFCTI is measured, and in a step S18, a maximum continuation time set value TFCTIM in the multi-cylinder fuel cut mode is computed by the following equation. $TFCTIM = FCMAX \cdot FCRATE$ (4)

Figure 5:
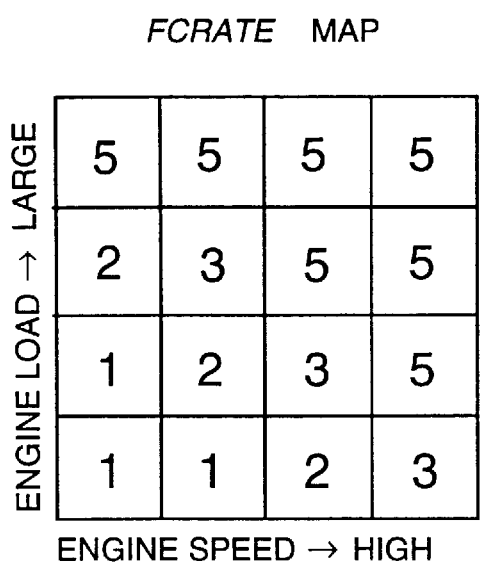
FIG. 5 is a map of a time ratio FCRATE according to this invention.

FCRATE is a time ratio set according to an engine load and the engine speed N from a map shown in FIG. 5. According to this map, FCRATE is set to be smaller the lower the speed of the engine 20 and the less the load on the engine 20.

Next, in a step S19, it is determined whether or not the multi-cylinder fuel cut mode continuation time JTFCTI is less than the maximum continuation time set value TFCTIM.

When JTFCTI is less than TFCTIM, the routine proceeds to a step S20, and fuel injection is cut from a fuel injector 24 in a predetermined cylinder set in the multi-cylinder fuel cut mode. In this multi-cylinder fuel cut mode, the number of cylinders in which fuel injection is stopped is set equal to or above the upper limit of cylinder number for performing fuel cut in the ordinary fuel cut mode. In the case of an eight cylinder engine, therefore, if the upper limit of cylinder number in the ordinary fuel cut mode is six, for example, fuel injection is stopped in six or more cylinders in the multi-cylinder fuel cut mode.

When JTFCTI has reached or exceeded TFCTIM in the step S19, the routine proceeds to a step S21, the fuel cut mode continuation times JFCON, JTFCTI are cleared, and the mode determining flag FM is reset to 0.

Subsequently, fuel injection is again cut from the fuel injectors 24 in predetermined cylinders in the ordinary fuel cut mode.

When TD=0 in the step S11, i.e. when there is no fuel cut request, the routine proceeds to a step S22 and subsequent steps. In the step S22, it is determined by the mode determining flag FM whether the present control is the ordinary fuel cut mode or the multi-cylinder fuel cut mode, as in the step S12.

When FM=0 i.e. in the case of the ordinary fuel cut mode, the ordinary fuel cut mode continuation time JFCON is measured in a step S23, and it is determined whether or not JFCON is less than the maximum continuation time set value FCMAX in a step S24.

When JFCON is less than FCMAX, the routine is executed from the step S11 in the next execution period of the process. When JFCON is equal to or greater than FCMAX, the mode determining flag FM is reset to 1 in a step S28, and the routine is executed from the step S11 in the next execution period of the process.

When FM=0 in the step S22, the routine proceeds to a step S25, and the multi-cylinder fuel cut continuation time JTFCTI is measured. In a step S26, the maximum continuation time set value TFCTIM is measured by the aforesaid equation (4), and it is determined whether or not JTFCTI has reached TFCTIM in the step S27.

When JTFCTI has not reached TFCTIM, the mode determining flag FM is set to 1 in the step S28.

When JTFCTI is equal to or greater than TFCTIM, the routine proceeds to a step S29, the fuel cut mode continuation times JFCON, JTFCTI are both cleared and the mode determining flag is reset to 0.

In this way, even when there is no fuel cut request, measurement of the ordinary fuel cut mode continuation time JFCON and the multi-cylinder fuel cut mode continuation time JTFCTI is continued. When these times exceed respectively the maximum continuation time set values FCMAX and TFCTIM, the fuel cut mode is changed, and when there is a further fuel cut request, fuel cut is performed according to the mode at that time.

The fuel cut which takes place under the aforesaid control will now be described with reference to FIGS. 6A and 6B.

In the aforesaid prior art controller having a fuel cut prohibition region, even when the slip factor of the drive wheels 28 is high and the slip cannot be controlled in the ordinary fuel cut mode, the fuel injectors 24 in all cylinders restart fuel injection when the fuel cut request continuation time exceeds the maximum continuation time set value FCMAX as shown in FIG. 6A (set to 1second in the figure). The unburned HC amount in the exhaust led into the catalytic converter 26 therefore decreases, the heat of reaction generated in the converter is suppressed and the temperature rise of the converter 26 is suppressed, but as the output torque of the engine 20 does not decrease, the slip of the drive wheels 28 is not adequately suppressed.

In the controller according to this invention, however, when the fuel cut request continuation time exceeds the maximum continuation time FCMAX, the mode changes from the ordinary fuel cut mode to the multi-cylinder fuel cut mode, and the number of cylinders in which fuel injection stops increases.

When the slip factor of the drive wheels 28 increases to such an extent that the slip of the drive wheels 28 is not suppressed in the ordinary fuel cut mode, the output torque of the engine 20 decreases still further in the multicylinder fuel cut mode, so the slip of the drive wheels 28 is adequately suppressed.

Further, when the number of cylinders in which fuel injection stops increases, the temperature of the exhaust gas led to the catalytic converter 26 falls due to the fresh gas expelled from these cylinders, and due to the decrease in the number of cylinders where fuel injection occurs, unburned fuel flowing into the converter 26 also decreases. The reaction heat of unburned fuel in the converter 26 is therefore suppressed, and excessive temperature rise of the converter 26 is prevented.

As shown in FIG. 5, FCRATE is set to become smaller the lower the rotation speed of the engine 20 and the smaller the load on the engine 20. The maximum continuation time set value TFCTIM in the multi-cylinder fuel cut mode obtained from equation (4) therefore also becomes shorter the lower the rotation speed of the engine 20 and the lower the load.

As a result, in the low speed, low load region when the exhaust temperature of the engine 20 is low, the proportion of fuel cut which is carried out in the ordinary fuel cut mode is high. Conversely, in the high speed, high load region, the proportion of fuel cut which is carried out in the multi-cylinder fuel cut mode is high due to the increase of the maximum continuation time set value TFCTIM. In the low speed, low load region, therefore, the driver does not experience an excessive feeling of deceleration due to multi-cylinder fuel cut, while in the high speed, high load region, temperature rise of the catalytic converter is prevented.

In the multi-cylinder fuel cut mode, fuel cut requests disappear for a certain time, and when there is another fuel cut request, multi-cylinder fuel cut is restarted without performing ordinary fuel cut within the limit of the maximum continuation time set value TFCTIM. On the other hand when there is a fuel cut request after the maximum continuation time set value TFCTIM has elapsed, ordinary fuel cut is performed first.

In this way, traction control can be performed within a wide range of running conditions of the engine 20 by changing the fuel cut mode according to the conditions.

The embodiments of this invention in which an exclusive property or privilege is claimed are defined as follows:

I Claim:

1. A fuel cut controller for cutting fuel supply to cylinders of a multi-cylinder engine of a vehicle according to a fuel cut request for the Purposes of reducing a slip of a drive wheel of said vehicle, comprising:

means for determining whether or not there is said fuel cut request, means for performing an ordinary fuel cut wherein fuel supply is stopped to at least one cylinder when there is said fuel cut request, the number of cylinders to which fuel supply is stopped being limited by a predetermined upper limit, means for measuring a continuation time JFCON of said ordinary fuel cut, means for determining whether or not said continuation time JFCON has reached a set value FCMAX, means for performing a multi-cylinder fuel cut wherein fuel supply is stopped to a number of cylinders no less than said upper limit when said continuation time JFCON reaches said set value FCMAX and said fuel cut request is continued, means for measuring an elapsed time JTFCTI after said continuation time JFCON reaches said set value FCMAX, means for determining whether or not said time JTFCTI has reached a set value TFCTIM, and means for terminating said multi-cylinder fuel cut when said time JTFCTI has reached said set value TFCTIM.

2. A fuel cut controller for cutting fuel supply to cylinders of a multi-cylinder engine of a vehicle according to a fuel cut request for the purposes of reducing a slip of a drive wheel of said vehicle, comprising:

means for determining whether or not there is said fuel cut request, means for performing an ordinary fuel cut wherein fuel supply is stopped to at least one cylinder when there is said fuel cut request, the number of cylinders to which fuel supply is stopped being limited by a predetermined upper limit, means for measuring a continuation time JPCON of said ordinary fuel cut, means for determining whether or not said continuation time JFCON has reached a set value FCMAX, means for performing a multi-cylinder fuel cut wherein fuel supply is stopped to a number of cylinders no less than said upper limit when said continuation time JFCON reaches said set value FCMAX and said fuel cut request is continued, means for measuring an elapsed time JTFCTI after said continuation time JFCON reaches said set value FCMAX, means for determining whether or not said time JTFCTI has reached a set value TFCTIM, means for terminating said multi-cylinder fuel cut when said time JTFCTI has reached said set value TFCTIM, wherein said multi-cylinder fuel cut performing means comprises means for terminating multi-cylinder fuel cut when there is no fuel cut request before said time JTFCTI reaches said set value TFCTIM, and means for restarting said multi-cylinder fuel cut when there is a fuel cut request before said time JTFCTI reaches said set value TFCTIM.

3. A fuel cut controller for cutting fuel supply to cylinders of a multi-cylinder engine of a vehicle according to a fuel cut request for the purposes of reducing a slip of a drive wheel of said vehicle, comprising:

means for determining whether or not there is said fuel cut request, means for performing an ordinary fuel cut wherein fuel supply is stopped to at least one cylinder when there is said fuel cut request, the number of cylinders to which fuel supply is stopped being limited by a predetermined upper limit, means for measuring a continuation time JFCON of said ordinary fuel cut, means for determining whether or not said continuation time JFCON has reached a set value FCMAX, means for performing a multi-cvlinder fuel cut wherein fuel supply is stopped to a number of cylinders no less than said upper limit when said continuation time JFCON reaches said set value FCMAX and said fuel cut request is continued, means for measuring an elapsed time JTFCTI after said continuation time JFCON reaches said set value FCMAX, means for determining whether or not said time JTFCTI has reached a set value TFCTIM, wherein set value TFCTIM is set to be larger the larger a load on said engine, and means for terminating said multi-cylinder fuel cut when said time JTFCTI has reached said set value TFCTIM.

4. A fuel cut controller for cutting fuel supply to cylinders of a multi-cylinder engine of a vehicle according to a fuel cut request for the purposes of reducing a slip of a drive wheel of said vehicle, comprising:

means for determining whether or not there is said fuel cut request, means for performing an ordinary fuel cut wherein fuel supply is stopped to at least one cylinder when there is said fuel cut request, the number of cylinders to which fuel supply is stopped being limited by a predetermined upper limit, means for measuring a continuation time JFCON of said ordinary fuel cut, means for determining whether or not said continuation time JFCON has reached a set value FCMAX, means for performing a multi-cylinder fuel cut wherein fuel supply is stopped to a number of cylinders no less than said upper limit when said continuation time JFCON reaches said set value FCMAX and said fuel cut request is continued, means for measuring an elapsed time JTFCTI after said continuation time JFCON reaches said set value FCMAX, means for determining whether or not said time JTFCTI has reached a set value TFCTIM, wherein set value TFCTIM is set to be larger the higher a rotation speed of said engine, and means for terminating said multi-cylinder fuel cut when said time JTFCTI has reached said set value TFCTIM.

5. A fuel cut controller for cutting fuel supply to cylinders of a multi-cylinder engine of a vehicle according to a fuel cut request for the purpose of reducing a slip of a drive wheel of said vehicle, comprising:

a fuel supply mechanism for respectively supplying fuel to said cylinders, and a microprocessor programmed to:

determine whether or not there is said fuel cut request, control said fuel supply mechanism to perform an ordinary fuel cut wherein fuel supply is stopped to at least one cylinder when there is said fuel cut request, the number of cylinders to which fuel supply is stopped being limited by a predetermined upper limit, measure a continuation time JFCON of said ordinary fuel cut, determine whether or not said continuation time JFCON has reached a set value FCMAX, control said fuel supply mechanism to perform a multi-cylinder fuel cut wherein fuel supply is stopped to a number of cylinders no less than said upper limit when said continuation time JFCON reaches said set value FCMAC and said fuel cut request is continued, measure an elapsed time JTFCTI after said continuation time JFCON reaches said set value FCMAX, determine whether or not said time JTFCTI has reached a set value TFCTIM, and control said fuel supply mechanism to terminate said multi-cylinder fuel cut when said time JTFCI has reached said set value TFCTIM.

6. A fuel cut controller as defined in claim 5, wherein said microprocessor is programmed to set value TFCTIM to be larger the larger a load on said engine.

7. A fuel cut controller as defined in claim 5, wherein said microprocess is programmed to set value TFCTIM to be larger the higher a rotation speed of said engine.

* * * * *